(12) United States Patent
Christodoulou et al.

(10) Patent No.: US 8,015,279 B2
(45) Date of Patent: Sep. 6, 2011

(54) NETWORK ANALYSIS

(75) Inventors: Athena Christodoulou, Bristol (GB); Richard Taylor, Bristol (GB); Christopher Tofts, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1128 days.

(21) Appl. No.: 11/410,979

(22) Filed: Apr. 26, 2006

(65) Prior Publication Data

US 2006/0271673 A1    Nov. 30, 2006

(30) Foreign Application Priority Data

Apr. 27, 2005   (GB) .................................. 0508477.7

(51) Int. Cl.
*G06F 15/173*   (2006.01)

(52) U.S. Cl. ........ 709/224; 709/223; 370/216; 370/242; 717/120; 717/127

(58) Field of Classification Search .................. 709/224, 709/223; 370/216, 242; 717/120, 127
See application file for complete search history.

(56) References Cited

U.S. PATENT DOCUMENTS

| | | | | |
|---|---|---|---|---|
| 6,584,502 | B1* | 6/2003 | Natarajan et al. | 709/224 |
| 7,376,969 | B1* | 5/2008 | Njemanze et al. | 726/22 |
| 7,925,729 | B2* | 4/2011 | Bush et al. | 709/223 |
| 2004/0010716 | A1* | 1/2004 | Childress et al. | 713/201 |
| 2005/0144505 | A1* | 6/2005 | Takeuchi et al. | 714/4 |
| 2007/0074170 | A1* | 3/2007 | Rossmann | 717/127 |

FOREIGN PATENT DOCUMENTS

| | | |
|---|---|---|
| GB | 2354137 A | 3/2001 |
| WO | 2004/010646 A2 | 1/2004 |

\* cited by examiner

*Primary Examiner* — Thu Ha T Nguyen

(57) ABSTRACT

A method of analysing a network having a plurality of computing and infrastructure elements, some of which run agents that monitor one or more network phenomenon, the method comprising the steps of: disabling a selected infrastructure element on which it is not possible to run a monitoring agent; acquiring data from an element adjacent a disabled element; and generating, from the acquired data, a signature representative of the selected element being inoperative.

13 Claims, 3 Drawing Sheets

| Node | Level | Device | Status | P/In | P/Out | UpTime | IP Add | Mac Add |
|---|---|---|---|---|---|---|---|---|
| N1 | - | PC | UP | 23098 | 12987 | 00:03.04 | 15.12.13.14 | 00-0B-CD-5D-BD-BH |
| N2 | | | | | | | | |
| N3 | | | | | | | | |
| N4 | 3 | router | UP | 3457K | 4060K | 98:12:34 | 15.12.13.15 | 00-5B-CC-55-BB-BH |
| N5 | 2 | switch | UP | - | - | 50:07:45 | - | 04-3C-DC-55-BF-EH |
| N6 | | | | | | | | |
| N7 | | | | | | | | |
| N8 | | | | | | | | |
| N9 | | | | | | | | |
| N10 | | | | | | | | |
| N11 | | | | | | | | |
| N12 | | | | | | | | |
| N13 | | | | | | | | |
| N14 | | | | | | | | |
| N15 | | | | | | | | |
| N16 | | | | | | | | |
| N17 | | | | | | | | |
| N18 | | | | | | | | |
| N19 | | | | | | | | |
| N20 | | | | | | | | |

NETWORK ANALYSIS

RELATED APPLICATIONS

The present application is based on, and claims priority from, UK Application Number 0508477.7, filed Apr. 27, 2005, the disclosure of which is hereby incorporated by reference herein in its entirety.

BACKGROUND TO THE INVENTION

1. Field of the Invention

The present invention relates to the analysis of a network of computing entities, such as, for example, personal computers, workstations and servers, and a plurality of infrastructure elements to facilitate their interconnection such as cables, routers, switches and hubs. Increasingly, large organisations which rely on such networks in order to perform their commercial activities, yet whose core commercial activities do not relate to computing infrastructure or its management outsource administration of their computing networks.

2. Description of Related Art

Software such as HP OPENVIEW provides for the administration of such networks, remotely where desirable, by an administrator, by modelling the network to enable the monitoring and analysis of faults. The significance of the ability to model a network when taking over administration of a sizeable network, is that it is not unusual for the administrator not to have complete knowledge of the elements within it or its topography. A model can be obtained, inter alia, by the installation of software agents on various computing entities which form part of the network infrastructure, and which monitor a variety of parameters, typically related to the implementation of various protocols (of a hierarchy of networking protocols), returning either data, either in the form that it is acquired, or condensed into a statistical form.

Certain elements of network infrastructure, however, do not support the use of software agents, either because they are simply physically not configured to store and/or execute software, or because network policy prevents agents being installed on them (for example because of confidentiality reasons). Accordingly it is not possible to monitor any of the various parameters described above at the network nodes provided by these 'dumb' infrastructure elements.

SUMMARY OF THE INVENTION

The present invention provides a method of analysing a network having a plurality of computing and infrastructure elements, some of which run agents that monitor one or more network phenomenon, the method comprising the steps of:
disabling a selected infrastructure element on which it is not possible to run a monitoring agent;
acquiring data from an element connected to a disabled element;
generating, from the acquired data, a signature representative of the selected element being inoperative.

BRIEF DESCRIPTION OF DRAWINGS

Embodiments of the present invention will now be described, by way of example, and with reference to the accompanying drawings, in which.

DESCRIPTION OF PREFRRED EMBODIMENTS

Figure 1:
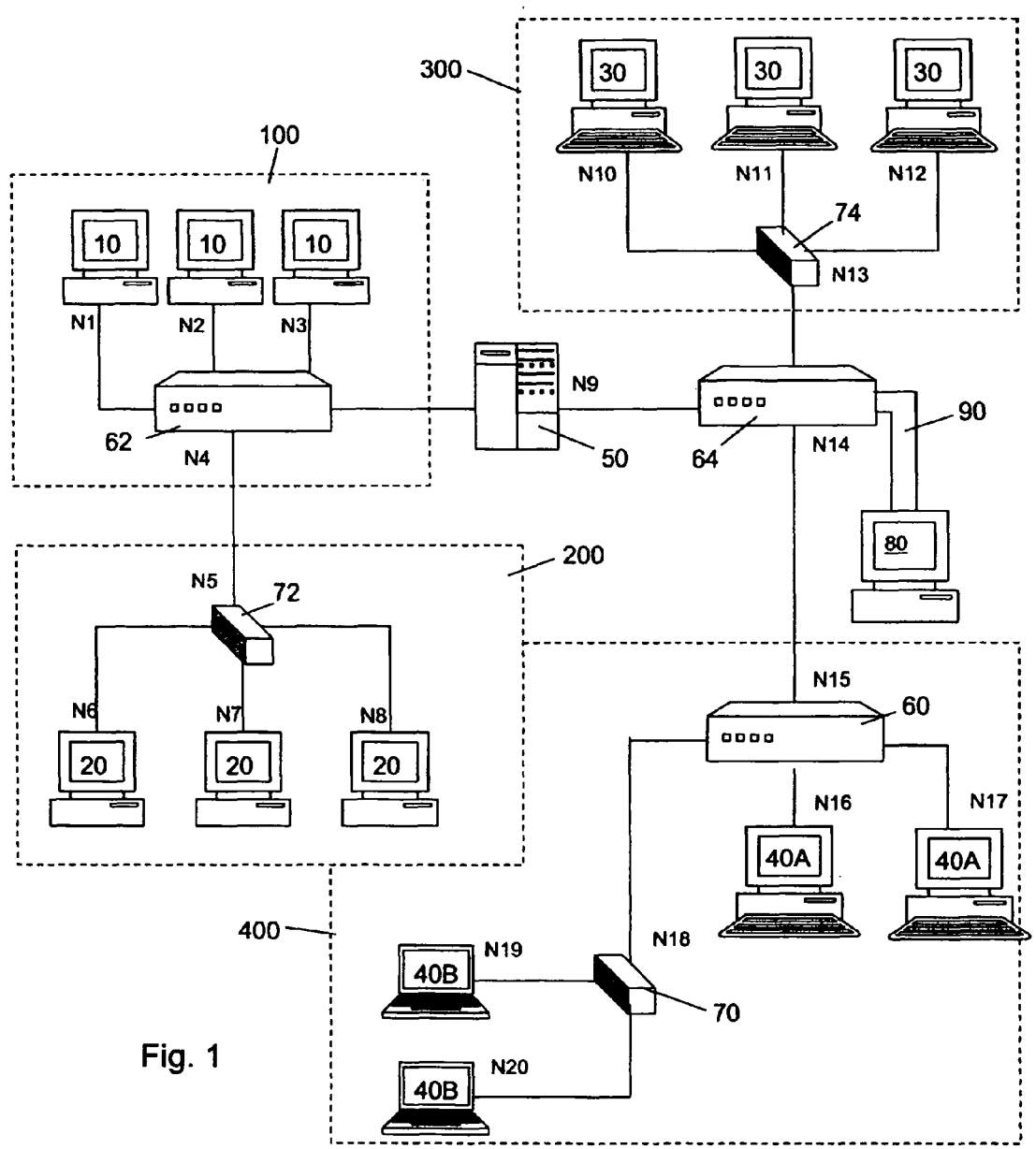
FIG. 1 is a schematic representation of a network.

Referring now to FIG. 1, a first and most basic embodiment of the present invention is illustrated in the context of a very simple network, including a plurality of computing entities interconnected by infrastructure entities. Specifically, in the present example, the computing entities are principally subdivided into four distinct subnets 100, 200, 300 and 400, with subnets 100-300 each including three desktop computers 10, 20, 30 respectively, and subnet 400 having two desktop computers 40A and two laptop computers 40B. These computing entities are all connected to a further computing entity, a server 50. The computers are interconnected by network infrastructure elements. In particular, the two laptop computers 40B are connected to via a switch 70 to router 60 (and then via router 64 to the server 50), while the two desktop computers in the subnet 400 are directly connected to router 60. Similarly, the three computers 10 are connected to the server via router 62; the three computers 20 are also connected to the server 50 via the router 62, but via an interstitial switch 72. The three computers 30 are similarly connected to the server 50 via a router 64 and interstitial switch 74.

Figures 2, 3:
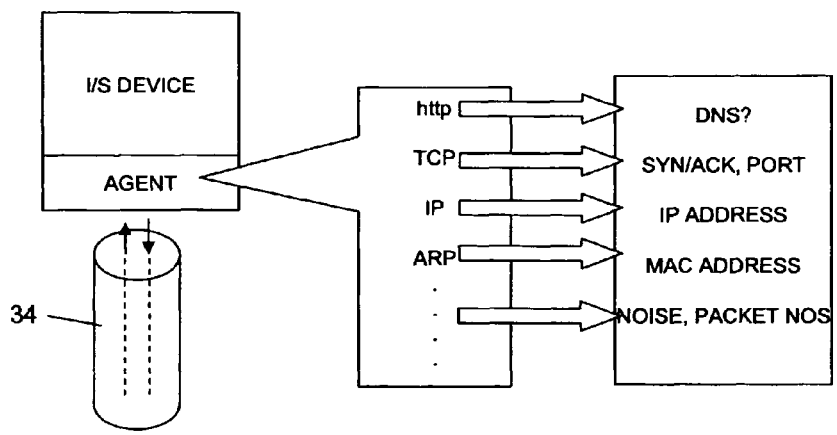
FIG. 2 is a representation of a table showing data obtained from the network of FIG. 1.
FIG. 3 is a schematic representation of the operation of a monitoring agent.

Software monitoring agents (not illustrated in FIG. 1) are installed and run on each of the computing entities, and, additionally, on each network infrastructure device which is capable of executing code. Typically, by way of a very general classification, but by no means entirely accurate, most routers and other devices which implement the Internet Protocol are capable of running a monitoring agent, whereas level 2 devices such as switches, which run at the Ethernet level on the hierarchy of networking protocols are not. Referring now to FIG. 3, the operation of an embodiment of monitoring agent is illustrated schematically. An infrastructure device such as the router 62, connected to other elements of the network via, in the present example, a LAN cable 34, through which data is schematically illustrated as flowing in both directions. The agent 36 can be thought of, functionally, as a 'shim' between the infrastructure device and the cable which monitors network phenomena such as data and physical parameters (such as noise, signal/noise ratio for example). In particular, the monitoring agent is, in the illustrated example, an aggregation of a plurality of small blocks of code, which execute to monitor activity which is occurring in accordance with different levels of the hierarchy of networking protocols (known as the 'network stack'). Thus, in the illustrated example the monitoring agent includes code which returns data on the implementation of, where appropriate, http (eg end-to-end data on logical port 8080, for example), TCP (for example, SYN ACK packets and logical port numbers), IP (IP addresses, for example), ARP (MAC addresses), and other information which can be garnered from the physical layers of the network stack, such as noise, data rate of packets incoming and outgoing, etc. On acquiring this information, the agent may, depending upon its level of sophistication, merely bundle the data into packets and transmit it to the administrator. Alternatively, it may, in the case of more sophisticated agents, perform active analysis on the basis of data collected (eg sending out data packets to another, typically adjacent, network node and monitoring any reply). It may also, either in combination with active analysis functions or without performing them, analyse the data acquired and return either statistical and/or status data to the administrator. This reduces the processing required by the administrator, and may also reduce the volume of data returned from the agent 36.

A remote network administrator 80 is connected to the server via the router 64 (and typically to the router 64 via a virtual private network (VPN) connection 90 across the Internet). The administrator runs network management software which cooperates with the monitoring agents to model the network, and thereby diagnose and remedy any network malfunction, or other network phenomenon which it is desired to alter. Referring now additionally to FIG. 2, according to one embodiment of network management software running at the network administrator, the administrator will have a table 120 of data relating to the various nodes—here N1 to N20 (but in practice usually many, many more). This data will typically be acquired from a combination of any prior knowledge of the network topography, data from the various monitoring agents running on various network infrastructure nodes. Thus, the table indicates, in relation to network node N1 that the device is a PC and that it's status is 'UP'—i.e. operational. The status is determined either by the administrator on the basis of data returned by the software agent, or the agent is configured to determine the status of the system and return that status. What constitutes an UP or a DOWN status is determined in accordance with administrative policy. Status, however, is typically a low-level parameter and related entirely to networking operability. Thus, for example a computing entity may be defined as being operational if it is sending and receiving packets—rather than on the basis of whether it is operating to perform some higher level operation such as whether it is capable of running applications programs used by an operator. In another alternative definition, computing entities within a network may be defined as being operational if the software agent resident upon them detects the dispatch and receipt of particular kinds of packets evidencing network operation, for example the various packets required to implement TCP/IP. Additionally, the table also indicates the number of incoming and outgoing packets; the UpTime during which these have been sent; the IP address of the computing entity and its MAC address (i.e. the globally unique ID of its Ethernet controller board). Similar data is provided in relation to the network node N4, for example, this being a router on which a monitoring agent is installed. Network node N5, however, is a switch, and is therefore incapable of supporting a monitoring agent. It is, however, nonetheless possible for the administrator 80 to establish, by means of the management software, certain behavioural parameters of this network infrastructure element from data returned by a monitoring agent at one or more topographically adjacent network nodes, here, for example N4 or N6-N8. Thus, for example, if adjacent monitoring agents are receiving packets from it then it can be inferred with some confidence that the device has an 'UP' status (although this is only a prima facie deduction and may, in certain circumstances, be incorrect), and in certain circumstances adjacent monitoring agents may return data indicating that it is a switch—a deduction which is may be possible to infer from its transmitted address data.

Although the switch at, for example, node N5 is incapable of supporting a monitoring agent, it does, however, support a degree of remote operation. Thus it is possible, using the management software on administrator 80, to disable or turn that switch off. This feature of its operability enables the acquisition of fault signatures which may be used to deduce failures. For example, in the case of network nodes N15-20, when all elements of the network are fully operational the administrator will be able to receive communications from the desktop computers 40A at nodes N16 and N17, and the two laptop computers 40B at nodes N19 and N20. In the event that the switch 70 ceases to operate, however, the administrator will no longer be able to receive communications from either of the laptop computers 40B, since these are only able to communicate with the administrator via the switch 70, but will still be receiving data acquired from adjacent node 60, which is transmitting data from the operational computers 40A. Accordingly, it follows that a 'signature' of the switch 70 being faulty would be communications from the desktop computers 40A and the router 60, but no communication from the laptop computers 40B.

At the level of complexity described, and in conjunction with a complete knowledge of the topography of the network, the example described above is trivial. In a network of realistic size and complexity, however, it ceases to be trivial. Further, the complexity is increased where the administrator does not have a full knowledge of the topography of the network and is unable to obtain one—for example, and by way of illustration, where the router 60 would not able to support a monitoring agent and is therefore unable to provide any data on elements 'behind' it (i.e. on the side of the network distal to the router at node N14) which cannot themself support a monitoring agent, the exercise is less trivial. In such a modified, 'unknown' scenario, the administrator will, in all probability, still be aware of the existence of the switch 70 (from the transmission of packets containing its address data, for example) and will be able to turn it on and off remotely, even though it is not apparent where that switch is exactly in the network. By disabling the switch 70, the administrator will thus, nonetheless, obtain a signature which is characteristic of the switch being faulty: that the monitoring agents at computers 40A and nodes N16 and N17, and router 60 at node N15 are returning data and are therefore 'visible' to the administrator 80, but that the monitoring agents on the laptop computers 40B at nodes N19 and N20 are not. It is, of course, logically correct that the signature described above is also representative of both laptop computers 40B being faulty, or one being faulty and the other being switched off or unconnected—this can be overcome by the configuration of the monitoring agents to return appropriate data indicating that the host computing entity on which it is running is about to power down. However, even if such relatively sophisticated data cannot be returned from monitoring agents, this scenario is both less likely, and moreover, since computers have human operators, the most likely cause of a fault which requires tracing is that an operational computing entity with a human operator is unable to communicate with another network entity, so that of the possibilities represented by that signature, the most likely—that it represents a fault at switch 70, is also the one of most practical concern.

Figure 4:
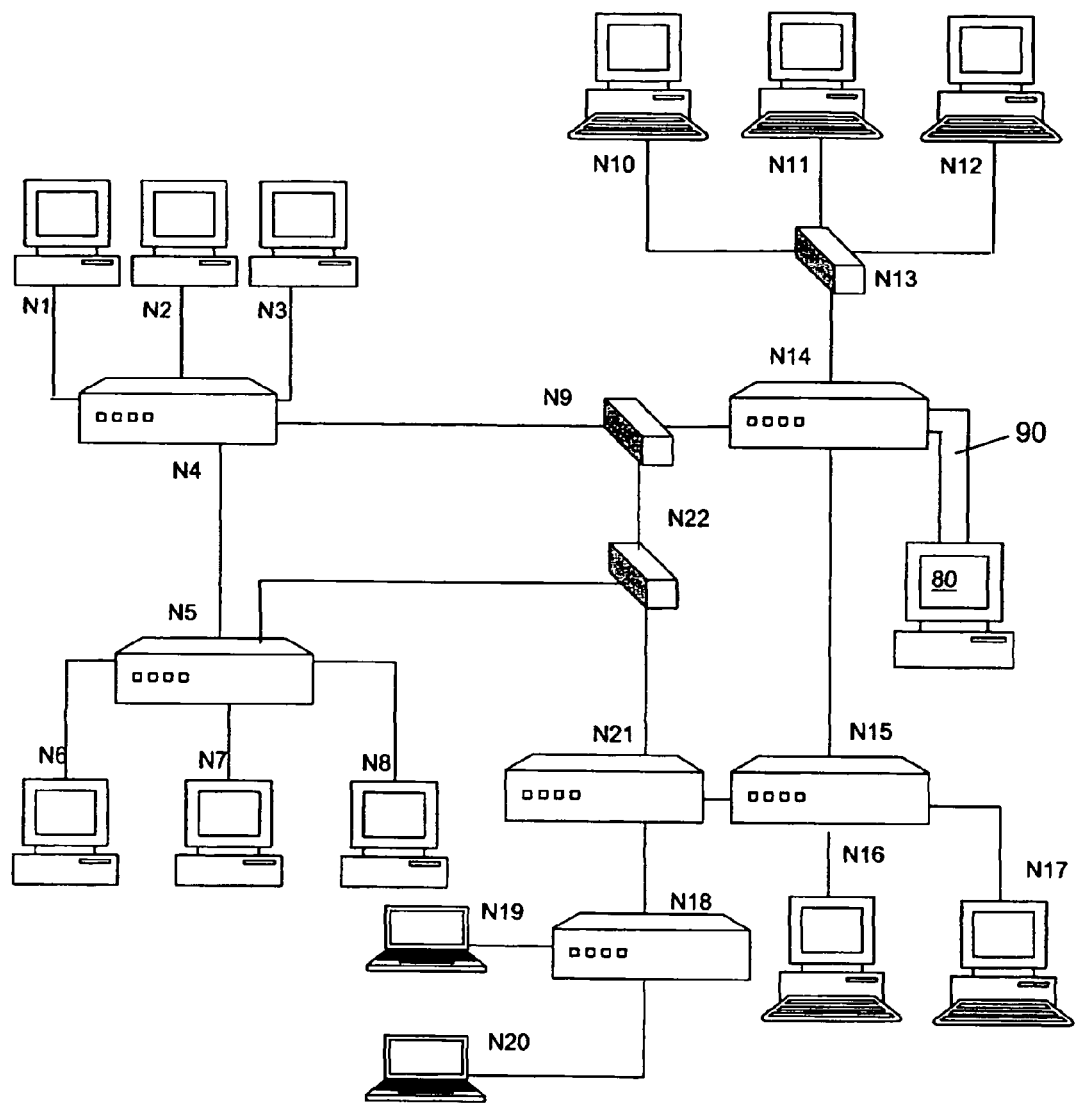
FIG. 4 is a schematic representation of an alternative network to illustrate the operation of an alternative embodiment of the present invention.

Thus the above example describes the principle of obtaining a fault signature on the basis only of UP/DOWN status data, by disabling one or more elements of the network infrastructure. In practice it is likely that the network will have greater complexity, and that an administrator will not be aware entirely of its topography. Referring now to FIG. 4, a modified version of the simple network in FIG. 1 is illustrated. In this example the illustrated network is similar—containing only the same number of computing entities as the network of FIG. 1, but additionally includes a number of further network infrastructure elements in a slightly different topography, which provide for a multiplicity of network pathways between one or more network nodes. As in the example of FIG. 1, the administrator 80 is connected to the network via a VPN 90, to enable remote network management, and in this example the administrator does not have prior knowledge of the network topography. Furthermore, primarily for the purposes of illustration in this example, the routers at nodes N4, N5, N14 and N21 are unable to run a monitoring agent, and so are unable to provide any information to the administrator relating to the nature of the infrastructure device at adjacent network nodes. It follows, therefore, that monitoring agent on the router at node N15 is able to establish that routers are located at nodes N14 and N21, but the nature of the infrastructure devices at nodes N4, N5, N9 and N22 is not discoverable via the agents. Nonetheless, the administrator still seeks an understanding of the nature of faults in the network, and one manner of obtaining this is to disable one or more of the nodes about which little is known—since it is still possible to do this remotely, even though their location with in the network is not ascertainable.

Thus, for example, the administrator initiate an enquiry to ascertain the nature of the network by sending packets to each of the computers 10, and waiting for a response. When all elements of the network infrastructure are operational, the response packets will bear the signature of their route, by IP address, and the number of 'hops'—i.e. the number of network nodes that have been traversed in the course of transmitting the response. Thus, a response packet from a computer ten, will indicate, when all infrastructure elements are operational:
6 HOPS IP Adds: A/N4–A/N14

(where A/N* is a shorthand for an IP address having the form xxx.xxx.xxx.xxx—with xxx being a number from 1 up to and including 255.)

Note that, being a level 2 networking device, and thus implementing the ethernet protocol, but not the Internet Protocol, the switch N9 will not have an IP address, but will, nonetheless manifest its presence by the number of Hops traversed to and from the interrogated computing entity.

Once the switch N9 is disabled, however, when the administrator disables the switch N9, the results will be very different:
14 HOPS IP Adds: A/N4–A/N5–A/N21–A/N15–A/N15 since the traffic must now take a more circuitous route from the administrator to and from the interrogated computing element. Once again, although adding a hop to the transmission, the switch N22 does not have an IP address and so the number of hops and the number of IP addresses which trace the route traversed, do not tally.

Thus it follows that a signature of the switch N9 being un-operational is that traffic from computing elements in the subnet 100 is slower because it has to traverse a significantly larger number of network nodes—and that, more particularly it has the traceroute path of IP addresses indicated above, and traverses 14 Hops. This is, therefore, a signature for the lack of operation of the node N9.

Once again, in this illustrated example, only relatively few types of monitoring data are returned—the number of hops and the route. Further data types acquired from monitoring agents, for example types illustrated in the table of FIG. 2, can be combined with the hop count and route information, where more complex and thorough analysis is desired, in order to generate a more complex signature, which will, in turn, therefore, be susceptible to interpretation to indicate the nature of an event such as a fault with correspondingly greater level of specificity. Additionally, more complex investigations involving both the disablement of combinations of elements, for example, as well as the use of data (including, as indicated above, varying numbers of types of data, as appropriate) from monitoring agents installed on adjacent network nodes, where applicable.

For example, in an alternative manner of obtaining a signature of the same event in the network schematically illustrated in FIG. 4, the monitoring agents on the computers at nodes N1-N3 and N6-N8 and, for example, N16 and N17 are employed. In particular, the monitoring agents, by monitoring the timing between the transmission and receipt of various packets required to implement the TCP/IP protocols, for example, can establish the relative speed (i.e. relative to some pre-established standard of fast and slow, for example) of a connection to another entity in the network. Thus, in this example where switch N9 is disabled, this can be indicated by a signature of greater complexity using the monitoring agents on these nodes. If the monitoring agents on each of the nodes N1-N3 and N6-N8 report that, firstly they are able to establish an operational connection to the administrator 80 (via the network pathway which includes the route . . . N22 - N21 - N15 - N14 . . . ), but secondly that this connection is categorised as slow, this is a signature indicative that the switch N9 is disabled. The use of monitoring agents in this manner has a number of advantages over direct interrogation. For example, it reduces the amount of traffic on the network, which might otherwise cause collisions, and also provides for a greater level of resolution in the generation of fault signatures as a result of the number of parameters (e.g. in the above example, two: status and speed) which are available for their creation.

The nature of the investigations are such that a large amount of data may be is generated. In a network having n nodes, each of which only has a binary output state (e.g. 'on/off'—in the present example monitoring agents return a plurality of parameters relating to the output state of the nodes) there are $2^n$ possible combinations. Current networks can typically have in excess of 10,000 elements to them. This level of data is unmanageable. Accordingly some compression is desirable, and this can be achieved as described in our co-pending UK patent application GB 2381606.

The invention claimed is:

1. A method of analyzing a network having a plurality of computing and infrastructure elements, some of which run agents that monitor one or more network phenomenon, the method comprising the steps of:
    disabling a selected infrastructure element on which it is not possible to run a monitoring agent and the selected infrastructure element is in communication with an administrative computing device via a monitored network device, wherein the monitored network device runs the monitoring agent;
    acquiring data from the monitored network device connected to a disabled element, wherein the data is acquired by the administrative computing device from the monitored network device connected to the disabled element;
    generating, from the acquired data, a signature representative of the selected infrastructure element being inoperative, wherein the signature includes route information and addresses relating to the computing devices along a network pathway.

2. A method according to claim 1, wherein the step of acquiring data comprises operating the monitoring agents to acquire and return data from at least one monitored network device connected to the disabled element.

3. A method according to claim 1 wherein the method further comprises the step, prior to disabling the selected infrastructure element, of interrogating a specified infrastructure element or computing device along a network pathway which includes the infrastructure element selected for disablement, and obtaining data from the interrogation.

4. A method according to claim 3 wherein the step of acquiring data includes the step of, interrogating the specified infrastructure element or computing device along a network pathway which does not include the disabled element, and obtaining data from the interrogation.

5. A method according to claim 4, wherein the signature includes the network pathway navigated during the interrogation when the selected infrastructure element is disabled.

6. A method according to claim 5 wherein the signature includes identities of a combination of operational network elements.

7. A method according to claim 1 wherein the network phenomenon include at least one of:
   (a) noise or other physical phenomena on a network connection; and
   (b) any data relating to implementation of a network communications protocol by a monitored network device or computing device.

8. A method according to claim 7 wherein the monitoring agent is adapted to interrogate an adjacent network element to obtain data relating to one or more of (a) and (b) in relation to the adjacent network element.

9. A method according to claim 1 wherein the signature includes identities of a combination of operational network elements.

10. A computer program product including executable instructions embedded on a non-transitory computer-readable medium adapted to run on an administrative computing device in a network of computing devices and infrastructure elements some of which run agents that monitor one or more network phenomenon, the computing device being adapted to:
   dispatch data seeking to disable a selected infrastructure element on which it is not possible to run a monitoring agent and the selected infrastructure element is in communication with an administrative computing device via a monitored network device, wherein the monitored network device runs the monitoring agent;
   acquire data from the monitored network device connected to a disabled element;
   generate, from the acquired data, a signature representative of the selected element being inoperative, wherein the signature includes route information and addresses relating to the computing devices along a network pathway.

11. A computer program product according to claim 10 wherein the data is acquired includes at least two parameters in respect of each network device or element, one of which is data relating to operational status of the network device or element concerned.

12. A computer program product according to claim 11 wherein the data is acquired by interrogating the network devices or elements, and the parameters include the number of network hops required to transmit data to the administrative computing device.

13. A computer program product according to claim 10 wherein the data is acquired by the monitoring agents and includes data relating to the speed of connectivity from the network element or device on which the monitoring agent is running, to another part of the network.

* * * * *